United States Patent [19]
Landi et al.

[11] Patent Number: 5,289,878
[45] Date of Patent: Mar. 1, 1994

[54] HORSESHOE IMPACT PAD

[75] Inventors: Curtis L. Landi; Susan L. Wilson, both of Sunnyvale, Calif.

[73] Assignee: Supracor Systems, Inc., Sunnyvale, Calif.

[21] Appl. No.: 15,474

[22] Filed: Feb. 9, 1993

Related U.S. Application Data

[63] Continuation-in-part of Ser. No. 3,791, Jan. 13, 1993, Pat. No.

[51] Int. Cl.⁵ .............................................. A01L 1/00
[52] U.S. Cl. .......................................... 168/14; 168/12
[58] Field of Search .................. 168/12, 14, 26, 28, 168/DIG. 1

[56] References Cited

U.S. PATENT DOCUMENTS

| | | | |
|---|---|---|---|
| 1,357,909 | 11/1920 | Sherwood | 168/14 |
| 3,180,421 | 4/1965 | Hirschberg et al. | 168/12 |
| 4,823,883 | 4/1989 | Colonel et al. | 168/12 |
| 5,121,798 | 6/1992 | Lindh | 168/12 |

FOREIGN PATENT DOCUMENTS 308309  3/1989  European Pat. Off. ...... 168/DIG. 1

Primary Examiner—Robert P. Swiatek
Attorney, Agent, or Firm—Claude A. S. Hamrick

[57] ABSTRACT

A horseshoe impact pad including a molded base of urethane material or the like having a recess formed in the upper, hoof engaging surface thereof and having a resilient honeycomb panel disposed within the recess and fixedly secured to the base. The horseshoe pad may be of full hoof design, for certain racing application, or may be generally limited to the hoof area covered by the horseshoe itself. The hoof side of the pad may also be configured to include a frog support component. The turf side of the pad may be provided with stabilizing ribs, heel shock-reducing projections, etc., and the base may be tapered to provide a desired tilt to the animal's hoof.

15 Claims, 6 Drawing Sheets

HORSESHOE IMPACT PAD

This application is a continuation-in-part of our co-pending application Ser. No. 08/003,791 filed Jan. 13, 1993, entitled "METHOD AND APPARATUS FOR MASKING THE ACOUSTIC SIGNATURE OF VESSELS", which is a continuation-in-part of U.S. Ser. No. 515,523, Jun. 19, 1991, U.S. Pat. No. 5,180,619, which is a continuation-in-part of U.S. Ser. No. 446,320, Dec. 4, 1989, U.S. Pat. No. 5,039,567, all of which are assigned to the assignee of the present application.

BACKGROUND OF THE INVENTION

1. Field of the Invention

The Present invention relates generally to energy-absorbing pads for interposition between a conventional metal horseshoe and a horse's hoof, and more particularly to an improved pad of the type described which includes a flexible honeycomb panel affixed to a less compressible, resilient substrate.

2. Description of the Prior Art

It has for some time now been the practice to place resilient pads between a horse's hoof and the horseshoe to absorb some of the shock and concussion that is experienced by the unprotected portion of the hoof as it meets the ground or pavement. It is also known to provide various "frog pads" in the central portion of the hoof for therapeutic purposes.

One prior art horseshoe pad is disclosed in the U.S. Pat. No. to Murphy (4,513,825, issued Apr. 30, 1985) and directed to a horseshoe "full" pad made of an energy-absorbing micro-cellular urethane foam having a tough outer skin. The pad is characterized by having a central layer or sheet which covers and can be trimmed to the hoof. Stabilizer bars and heel shock-reducers are mounted into the turf side of the pad and rise to about the level of the horseshoe so that they, along with the shoe, take up and absorb some of the shock. A frog pad may also be molded into the hoof side of the pad to further protect and stimulate the soft tissue of the hoof.

Since the landing force of a horse is usually four to five times its weight, reducing concussion from an impacting horse hoof onto the ground is not easy to accomplish in a predictable manner, especially in animals which may weigh 1000 pounds or more. Prior to Murphy, most prior art hoof pads were either hard and made of material such as leather, or soft throughout the entire pad and made of nonformed rubber. If it were hard, the pad did not adequately cushion, and it if were soft, the pad did not last. In the Murphy pad, a tough durable outer surface was combined with a soft cushioning interior which, when combined with the functional frog pad and heel shock-reducer, together with central stabilizing bars, yielded improved functional performance.

Applicant has found, however, that through the use of a honeycomb pad, in place of prior art materials, substantial improvements in performance can be obtained.

SUMMARY OF THE INVENTION

It is therefore a principal object of the present invention to provide a lightweight horseshoe pad having improved shock-absorbing characteristics.

Another object of the present invention is to provide an improved horseshoe pad of the type described utilizing honeycomb configured shock-absorbing materials.

Still another object of the present invention is to combine a honeycomb panel with a molded or cast base material to obtain the anisotropic load cushioning benefits of the honeycomb panel, while at the same time providing superior load distribution so as to avoid injury to the soft tissue of the hoof.

Briefly, a presently preferred embodiment of the subject invention includes a molded base of urethane material or the like having a recess formed in the upper, hoof engaging surface thereof and having a resilient honeycomb panel disposed within the recess and fixedly secured to the base. The horseshoe pad may be of full hoof design, for certain racing applications, or may be generally limited to the hoof area covered by the horseshoe itself. The hoof side of the pad may also be configured to include a frog support component. The turf side of the pad may be provided with stabilizing ribs, heel shock-reducing projections, etc., and the base may be tapered to provide a desired tilt to the animal's hoof.

An important advantage of the present invention is that it provides a lightweight hoof pad that is highly effective in absorbing impact energy, yet does not interfere with the normal functional relationship between horseshoe and hoof.

Another advantage of the present invention is that it provides an improved shock-absorbing protective padding for the soft central portion of the hoof to prevent injury thereto.

Still another advantage of the present invention is that it can be configured in numerous ways to provide various advantageous shock-reducing and therapeutic pad configurations.

These and other objects and advantages of the present invention will no doubt become apparent to those skilled in the art after having read the following detailed description of the preferred embodiments which are illustrated in the several figures of the drawing.

IN THE DRAWING

DETAILED DESCRIPTION OF THE PREFERRED EMBODIMENT

Figure 1:
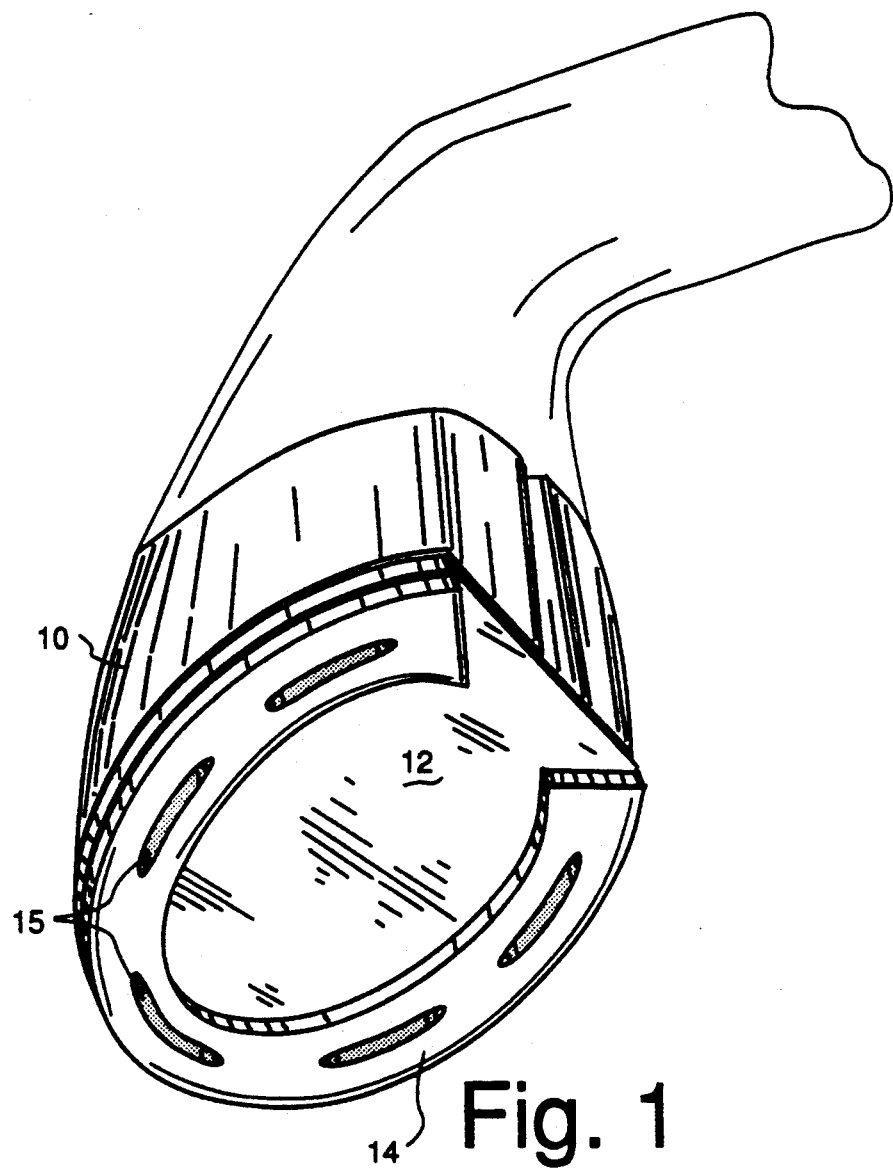
FIG. 1 is a perspective view of a horse hoof showing an energy-absorbing pad in accordance with the present invention interposed between the hoof and horseshoe.

Referring to FIG. 1 of the drawing, a horse's hoof is shown at 10, having a full pad 12 in accordance with the present invention disposed between the hoof and a horseshoe 14. As in the case of prior pads, the pad 12 is positioned between hoof and horseshoe during the shoeing process, and is secured in place by horseshoe nails which are normally driven through the horseshoe slots 15 and through the pad 12 into the perimeter of the hoof 10. After the pad and shoe are affixed to the hoof, the outer edges of the pad are trimmed with a knife or file to provide a smooth surface joining hoof and shoe.

Figure 2:
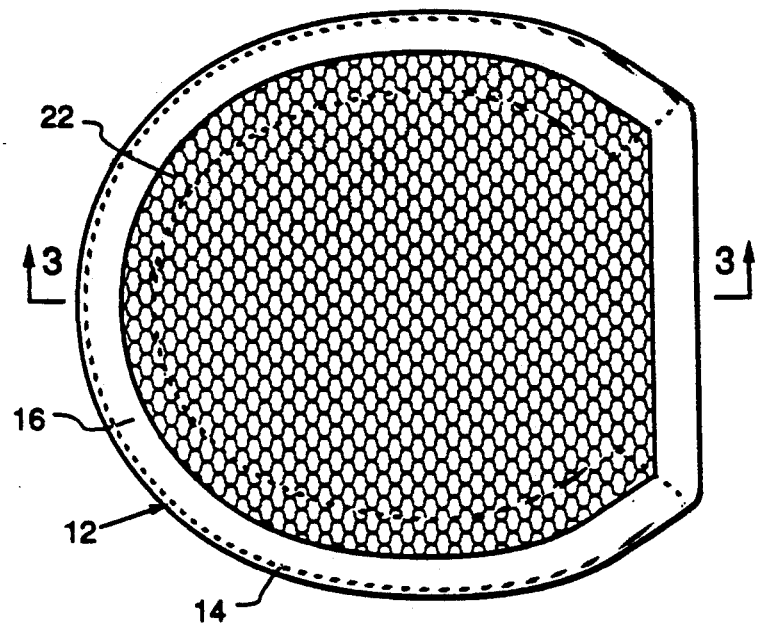
FIG. 2 is a plan view showing the upper or hoof side of the pad of FIG. 1.
Figure 3:
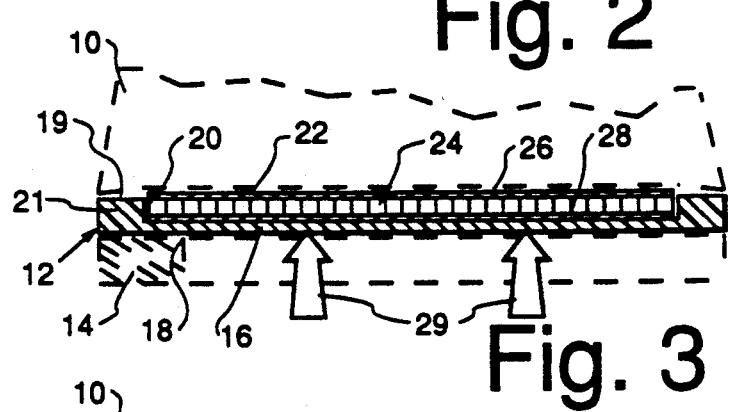
FIG. 3 is a cross-section taken along the line 3—3 in FIG. 2.

In FIGS. 2 and 3 of the drawing, a plan and sectional view of the pad 12 are respectively shown. In accordance with the preferred embodiment, a base 16 cast from a thermoset, transparent urethane of 95 Shore A durometer is provided, the outer perimeter of which generally conforms to a particular type and size of horse hoof or horseshoe. The base includes a planar bottom surface 18 and an upper surface 19 having a cavity or recess 20 formed therein leaving an upstanding perimeter rim 21. The base is typically 0.188 inch thick with a cavity or recess depth of 0.125 inch. The width of rim 21 is approximately 0.250 inch all around, but could be of any desired width. For example, the rim might be as wide as the horseshoe width.

Disposed within the recess 20 is a resilient honeycomb panel 22 which is of the type described in U.S. Pat. No. 5,039,567 to Landi et al., and includes an expanded core 24 having bonded to the upper and lower surfaces thereof, facing sheets 26 and 28, respectively. The core 24 is preferably made of 0.020" thick core ribbon stock intermittently bonded and then expanded as disclosed in the Landi et al. patent to form the cellular honeycomb structure. The ribbon stock is of 90 Shore A durometer, and the cell diameters are of approximately 0.187". The facing sheets 26 and 28 are 0.015" thick 90 Shore A plastic material fused to the honeycomb core 24 to hermetically seal each cell, and the overall panel thickness is approximately 0.125". Although the durometers stated above are preferable, it has been found that variations on the order of +5 on the A scale are acceptable. Similarly, other combinations of dimensions may be suitable for particular applications. Furthermore, although the durometer of the base material is slightly greater than that of the honeycomb panel, the final trimming of the side edges normally leaves a narrower rim 21, with the result that the effective stiffness or compressibility across the pad at the honeycomb panel level is substantially uniform.

The panel is an anisotropic three-dimensional structure having predetermined degrees of flex along its orthogonal x, y, and z axes. Each cell is formed in part by four generally S-shaped wall segments each of which is shared with an adjacent cell. In addition, each airtight cell shares double thickness wall segments with two adjacent cells.

The panel has high tear and tensile strength and is highly resilient, with optimal compression load and shock absorption or dispersion characteristics, yet is extremely lightweight. Selected combinations of elastomeric material, honeycomb cell configuration, core thickness and facing material variables will determine the panel's characteristics of softness or hardness, resilient recovery rate and rigidity or flex as required for a particular application. The facing materials can be selected from a wide variety of films. The panel 22 is adhesively secured to the cast urethane base 16 with a suitable urethane adhesive.

It will be appreciated by those skilled in the art that although the pad 12 absorbs a portion of the shock transmitted from shoe 14 to hoof 10, its principal function is to absorb and spread the forces shown generally by the arrows 29 and normally experienced by the otherwise unprotected central portion of the hoof. For example, on surfaces soft or displaceable enough to be penetrated by the horseshoe, a large percentage of the impact load will be borne by the portion of the hoof not covered by the shoe. The subject pad is designed to absorb a substantial portion of such impact load. In addition, the pad 12 will protect against bruises and lacerations caused by rocks, pebbles and other objects upon which the horse may step.

Figure 4:
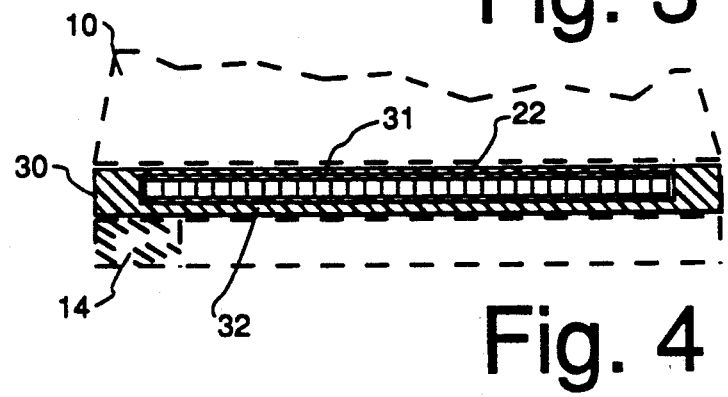
FIG. 4 is a cross-section similar to that of FIG. 3, but showing a fully cast pad alternative embodiment of the present invention.

FIG. 4 is a cross-section similar to that of FIG. 3 showing the honeycomb panel 22 disposed within and enveloped by a cast urethane base 30. The thicknesses of the upper and lower covering layers 31 and 32 are selected to fit the particular application.

Figure 5:
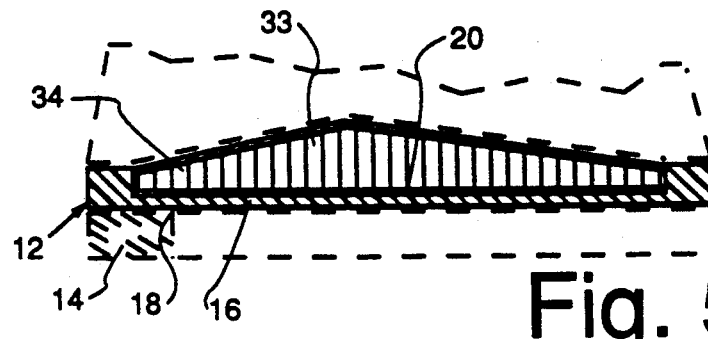
FIGS. 5 and 6 are cross-sections similar to that of FIG. 3, but showing the inclusion of frog pads, stabilizer ribs and heel shock-reducers in accordance with the present invention.

In FIG. 5, a modified pad is depicted having a humped portion 33 in the honeycomb panel 34 which is thicker at the pad midsection and tapers toward the front and rear of the pad. The thickness of the hump may be uniform in the transverse direction or laterally tapered. In the embodiment of FIG. 5, the entire frog-engaging surface is formed by the shaped honeycomb panel 34.

Figure 6:
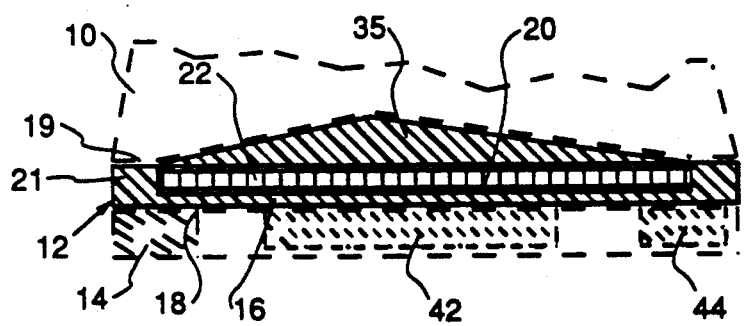

In FIG. 6, the frog pad is formed by affixing a molded urethane member 35 to the upper surface of a honeycomb panel 22 disposed within the recess 20 in base 16. In addition, molded or preformed cleats and/or longitudinal stabilizer bars 42 and raised heel pads 44 can be provided integral with or affixed to the bottom side of base 16. The frog pad will of course be of a shape and thickness determined by the size and breed of horse being shod, and will usually be designed to both protect the frog and stimulate and increase vascular circulation.

Figure 7:
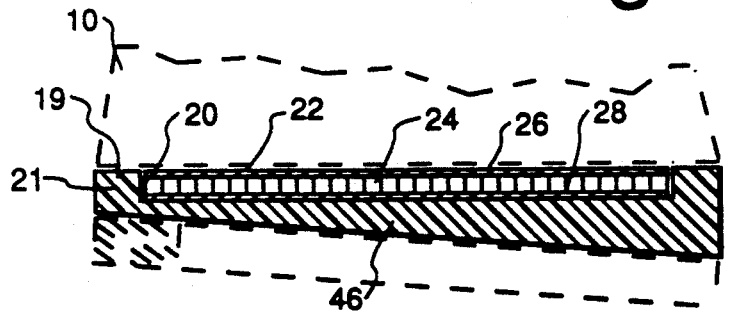
FIG. 7 is again a similar cross-section showing a wedge pad in accordance with the present invention.

In FIG. 7, a "wedge pad" variation of the preferred embodiment is depicted wherein the pad 46 is tapered from front to rear so as to provide a predetermined tilt to the animal hoof when the pad is installed.

Figure 8:
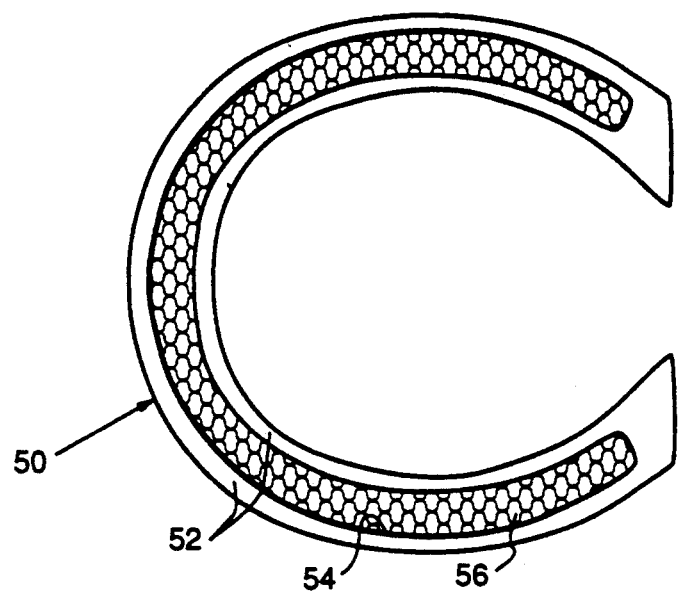
FIG. 8 is a plan view showing a racing pad in accordance with the present invention.

In FIG. 8, an alternative pad, configured particularly for racing applications, is depicted at 50 and is similar in construction to the previously described embodiment of FIGS. 1-3, except that the central portion of the pad is removed, and the "footprint" of the pad corresponds generally to the plan form of a horseshoe. Note that the perimeter rim 52 bordering the entire pad and defining the recess 54 into which the generally U-shaped honeycomb pad 56 is positioned and affixed. In this particular application the intent is to limit movement of the shoe relative to hoof to a minimum while at the same time absorbing shock forces which are normally transmitted to the hoof.

Figure 9:
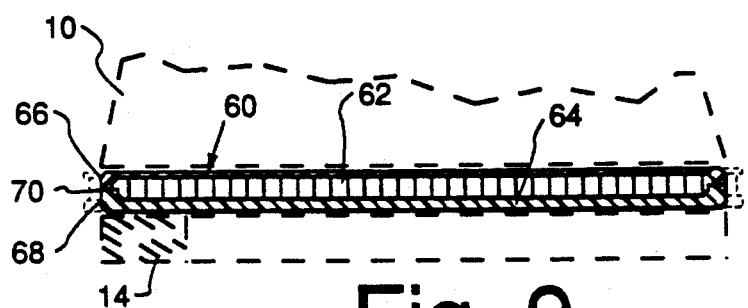
FIGS. 9 and 10 are cross-sections similar to that of FIG. 3, showing further alternative embodiments of the present invention.
Figure 10:
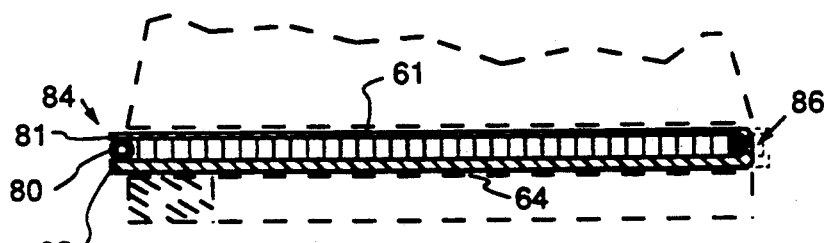

In FIGS. 9 and 10 another alternative form of pad is depicted along with two methods of providing edge treatment to the pads. In both embodiments no separate base is used. As illustrated, the pad 60 is comprised solely of a honeycomb panel made in the same way as the honeycomb panels 22 referred to above except that the expanded core 62 is approximately 0.100 inch thick and the thickness of the bottom facing 64 is increased to 0.40 inch or greater.

In order to close the core edges, two methods are illustrated. As suggested in FIG. 9, closure may be accomplished using a heating iron having a temperature sufficient to first soften and collapse the two edges 66 and 68 inwardly, and then melt and fuse the edges together at 70. The fused perimeter would then be trimmed flush with hoof and shoe as described above.

Alternatively, as depicted at 72 in FIG. 10, a tube 80 of 1/16 inch diameter (O.D.) thermoplastic urethane (TPU) may be wrapped about the perimeter of said pad and positioned between the edges 81 and 82 of the upper and lower facing sheets 61 and 64 as indicted at 84. Alternatively, a solid strip of TPU could be used. The edge would then be thermally sealed by using a heating iron or the like to thermally collapse and bond the edges and tube as indicated at 86. If needed, the fused edge could then be trimmed or filed to conform to the hoof/shoe edge profile as desired.

As a further alternative, an oversize honeycomb panel with or without finished border could be installed between the hoof and shoe of a horse, with the selvage being thermally deformed inwardly in situ, by the careful application of heat, to provide a smooth bordering surface spanning the space between the outer perimeter of the horseshoe and the hoof and occupied by the pad.

Figure 11:
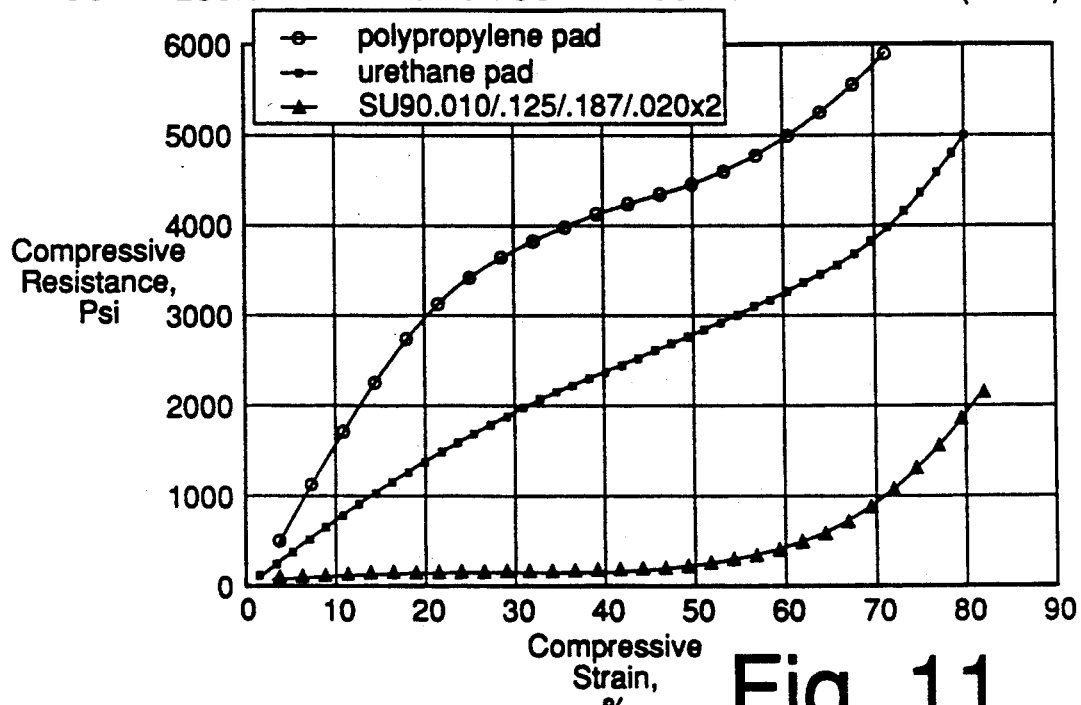
FIGS. 11 and 12 are compression/deflection grafts comparing characteristics of the preferred embodiment to prior art pads.
Figure 12:
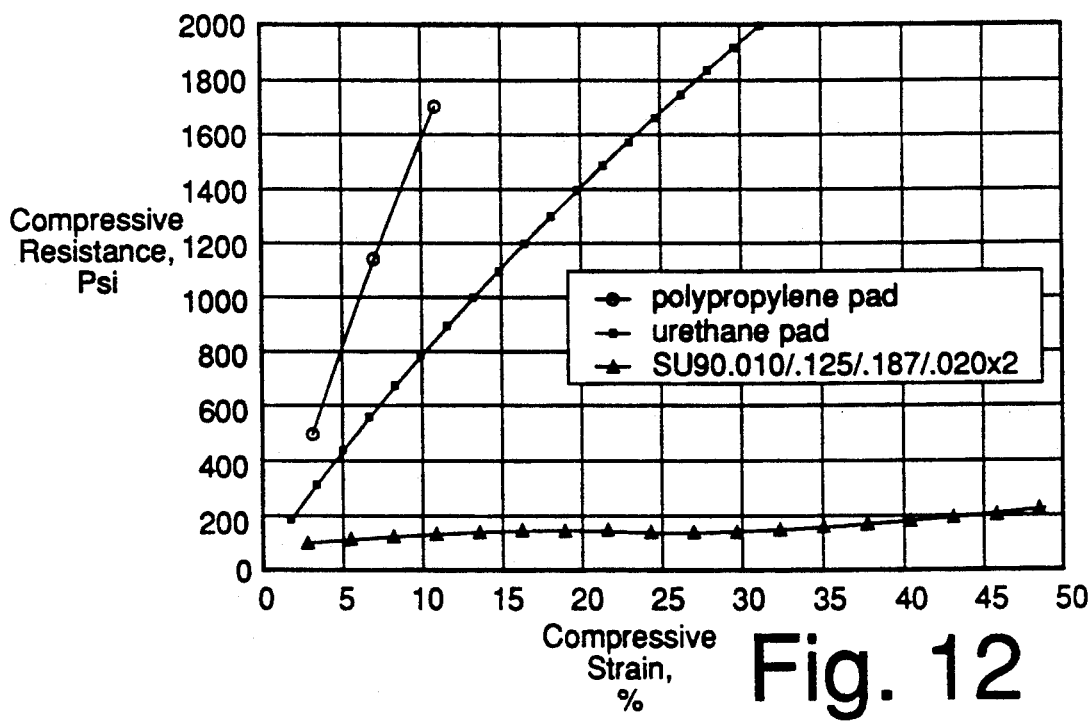

FIGS. 11 and 12 are compressive-resistance graphs using different scales to demonstrate the differences between conventional hoof pads made by two of Applicants' competitors and Applicants' hoof cushion designated "SU90.010/0.125/0.187/0.020×2". The easiest way to understand the graph is to think of it as a transmitted force graph. The curves show that as the different pads are compressed, the load transmitted to the hoof differs dramatically. In real life, this might equate to the horse stepping on a surface irregularity, such as a rock, that locally compresses the pad. If the pad is locally compressed by 50%, the force transmitted to the horse's hoof is approximately 250 psi by Applicants' pad vs. approximately 3300 psi and 4400 psi for the urethane pad and the polypropylene pad, respectively. In addition, post test inspection of the various pads reveals that the conventional pads exhibited permanent indentations when loaded to these high levels, whereas Applicants' pad recovered completely from the 2200 psi load at 80% deflection (see the graph shown in FIG. 10).

These graphs indicate that the conventional pads essentially bottom out when they are initially compressed (i.e., they provide very little isolation for the hoof). Due to the air spring effect, of Applicants' cellular structure, as the honeycomb starts to bottom out, the graphs show that the subject pad provides a rising rate cushion as it nears the end of its compressive strain capability. This effect is more gradual and offers more protection to the hoof than the characteristics of the conventional pads if the load is high enough compress the pad that far. It should be apparent that the present invention offers material improvement over the prior art pads.

Although the present invention has been described above in terms of a specific embodiment, it is anticipated that alterations and modifications thereof will no doubt become apparent to those skilled in the art. For example, the subject pad could have the metal horseshoe molded or cast into the base to form an integral unit. Moreover, any or all of the above described features could be cast into an integral base enveloping one or more honeycomb panels. It is therefore intended that the following claims be interpreted as covering all such alterations and modifications as fall within the true spirit and scope of the invention.

We claim:

1. A shock-absorbing impact pad for horses comprising:
   a generally oval-shaped base truncated on one side to have an outer perimeter configured to correspond to the hoofprint of a horse, said base being made of a relatively firm, resilient material and having secured thereto a resilient honeycomb panel comprised of a honeycomb-configured core having a first sheet of resilient material bonded to one face of said core and a second sheet of resilient material bonded to the opposite face of said core to form a plurality of hermetically sealed cells, whereby when placed between a horseshoe and horse's hoof the pad tends to absorb a substantial part of the shock energy that would otherwise be transmitted to the hoof.

2. A shock-absorbing impact pad as recited in claim 1 wherein said base includes a recess formed on the hoof-facing side thereof and wherein said honeycomb panel is disposed within said recess and is bonded thereto.

3. A shock-absorbing impact pad as recited in claim 1 wherein said honeycomb pad is fully enveloped by said base.

4. A shock-absorbing impact pad as recited in claim 1 and further comprising frog-engaging means formed on the hoof-facing side of said pad.

5. A shock-absorbing impact pad as recited in claim 4 wherein said frog-engaging means is formed by a shaped outer surface of said honeycomb panel.

6. A shock-absorbing impact pad as recited in claim 4 wherein said frog-engaging means is comprised of a shaped resilient member affixed to the hoof-facing side of said resilient honeycomb panel.

7. A shock-absorbing impact pad as recited in claim 1 wherein said base is tapered from toe to heel to cause the horse's hoof to tilt forwardly.

8. A shock-absorbing impact pad as recited in claim 1 wherein said base is provided with elongated stabilizing ribs disposed on the turf-engaging face of said base in the region to be partially encircled by the horseshoe.

9. A shock-absorbing impact pad as recited in claim 1 wherein said base includes raised heel pads disposed in the portion of said base lying between the open ends of a horseshoe affixed thereto.

10. A shock-absorbing impact pad as recited in claim 1 wherein said pad has a plan form corresponding substantially to the footprint of a horseshoe.

11. A shock-absorbing impact pad for horses comprising:
    a generally oval-shaped base truncated on one side to have an outer perimeter configured to correspond to the hoofprint of a horse, said base being made of a relatively firm, resilient material and having a recess formed in its hoof facing side; and
    a resilient honeycomb panel disposed within said recess and bonded to said base, said honeycomb panel being comprised of a honeycomb-configured core having a first sheet of resilient material bonded to one face of said core and a second sheet of resilient material bonded to the opposite side of said core to form a plurality of hermetically sealed cells, whereby when placed between a horseshoe and horse's hoof the pad tends to absorb a substantial part of the shock energy that would otherwise be transmitted to the hoof.

12. A shock-absorbing impact pad for horses comprising:
    a generally oval-shaped resilient honeycomb panel truncated on one side to have an outer perimeter configured to correspond to the hoofprint of a horse, said honeycomb panel being comprised of a honeycomb-configured core having a first sheet of resilient material bonded to one face of said core and a second sheet of resilient material bonded to the opposite side of said core to form a plurality of hermetically sealed cells, whereby when placed between a horseshoe and horse's hoof the pad tends to absorb a substantial part of the shock energy that would otherwise be transmitted to the hoof.

13. A shock-absorbing impact pad as recited in claim 12 wherein the bordering edges of said first and second sheets are deformed inwardly toward each other and are fused together to provide a closed perimeter of substantially uniform thickness around a plan form corresponding substantially to the footprint of a horseshoe.

14. A shock-absorbing impact pad as recited in claim 13 wherein a strip of plastic material is placed between said bordering edges before they are deformed, and said edges are fused to said strip as they are fused together.

15. A shock-absorbing impact pad as recited in claim 12 wherein the perimeter of said panel is thermally formed in situ to conform to the smooth exterior surface spanning the space between horseshoe and hoof and occupied by said pad.

* * * * *